United States Patent
Jarvi et al.

(10) Patent No.: US 6,831,968 B2
(45) Date of Patent: Dec. 14, 2004

(54) OUTPUTTING OF REPORTS GENERATED BY A TELEPHONE EXCHANGE

(75) Inventors: Jukka Jarvi, Jyvēskylē (FI); Kimmo Poikolainen, Aanekoski (FI)

(73) Assignee: Nokia Corporation, Espoo (FI)

( * ) Notice: Subject to any disclaimer, the term of this patent is extended or adjusted under 35 U.S.C. 154(b) by 174 days.

(21) Appl. No.: 10/203,349

(22) PCT Filed: Jan. 26, 2001

(86) PCT No.: PCT/FI01/00066

§ 371 (c)(1),
(2), (4) Date: Dec. 2, 2002

(87) PCT Pub. No.: WO01/60043

PCT Pub. Date: Aug. 16, 2001

(65) Prior Publication Data

US 2003/0165221 A1 Sep. 4, 2003

(30) Foreign Application Priority Data

Feb. 9, 2000 (FI) ............................................. 20000276

(51) Int. Cl.⁷ ............................................. H04M 15/00
(52) U.S. Cl. .................. 379/119; 379/116; 379/114.03; 379/114.01; 379/135
(58) Field of Search ........................... 379/111, 112.01, 379/112.06, 112.07, 112.08, 112.09, 114.01, 114.03, 114.04, 114.05, 114.28, 115.01, 116, 119, 121.05, 122, 126, 127.05, 133, 135; 709/101, 201; 707/101, 102, 500, 505, 506, 507, 508

(56) References Cited

U.S. PATENT DOCUMENTS 4,979,207 A    12/1990  Baum et al.
5,737,399 A     4/1998  Witzman et al.
5,768,353 A  *  6/1998  Browne .................. 379/115.03
5,799,073 A  *  8/1998  Fleischer et al. ....... 379/112.01
5,974,443 A  * 10/1999  Jeske .......................... 709/202
6,249,572 B1    6/2001  Brockman et al.
6,553,107 B2 *  4/2003  Jarvi et al. ............. 379/114.03
6,587,899 B1 *  7/2003  Jarvi et al. ..................... 710/33
2002/0019830 A1 *  2/2002  Hamberg et al. ........... 707/204
2002/0034285 A1    3/2002  Jarvi et al.

FOREIGN PATENT DOCUMENTS

WO          9308661       4/1993
WO          9524094       9/1995
WO          9849825      11/1998

\* cited by examiner

Primary Examiner—Quoc Tran
(74) Attorney, Agent, or Firm—James A. Retter; Ware, Fressola, Van Der Sluys & Adolphson

(57) ABSTRACT

The present invention relates to processing the data produced by a telephone exchange, the transfer of the data through a transfer medium to a receiving equipment, and outputting of the processed data in the receiving equipment on a screen or paper. The data are processed in the telephone exchange to reduce the amount of data transferred through the transfer medium. This will be accomplished by using fixed forms in the exchange and the receiving equipment. A form will be used to separate the binary data of the specified fields from the data pre-processed in the telephone exchange. The receiving equipment will use a form that corresponds with that of the telephone exchange to separate the incoming binary data into the parts specified in the form, and each part will be attached to the field indicated by the corresponding identifier information.

11 Claims, 8 Drawing Sheets

IMMEDIATE_CHARGING_REPORT_S:

| | |
|---|---|
| DIR_NUMBER_A | @16C(25) |
| DIR_NUMBER_B | @16C(41) |
| SUBSC_NBR_ID_A | @1DW(57) |
| START_TIME.HOURS | @1C(20) |
| START_TIME.MINUTES | @1C(19) |
| START_TIME.SECONDS | @1C(18) |
| START_TIME.DAY | @1C(21) |
| START_TIME.MONTH | @1C(22) |
| START_TIME.YEAR | @1W(23) |
| REPORT_TYPE | @1C(61) |
| CALL_DURATION.HOUR | @1C(64) |
| CALL_DURATION.MIN | @1C(63) |
| CALL_DURATION.SEC | @1C(62) |
| TARIFF_NO | @1W(65) |
| TARIFF_TYPE | @1C(67) |
| PRICE | @1DW(68) |

Fig. 3

CHG_IMMEDIATE_CHARGING_FORMAT:

IMMEDIATE CHARGING REPORT   DX200   AKI

| | |
|---|---|
| SUBSCRIBER NUMBER A | @16C(25) |
| SUBSCRIBER NUMBER B | @16C(41) |
| SUBSCRIBER NUMBER A ID | @1DW(57) |

| | |
|---|---|
| START TIME  (HH:MM:SS) | @1C(20):@1C(19):@1C(18) |
| START DATE  (DD.MM.YY) | @1C(21):@1C(22):@1W(23) |

CALL DURATION  (HH:MM:SS)    @1C(64):@1C(63):@1C(62)

| | | | |
|---|---|---|---|
| REPORT TYPE | @1C(61) | | |
| TARIFF NO | @1W(65) | TARIFF TYPE | @1C(67) |
| PRICE | @1DW(68) | | |

Fig. 4

```
IMMEDIATE CHARGING REPORT   DX200   AKI

SUBSCRIBER NUMBER A        0923445657
SUBSCRIBER NUMBER B        038790898
SUBSCRIBER NUMBER A ID     8899AF01h

START TIME  (HH:MM:SS)     21:17:34
START DATE  (DD.MM.YY)     03.02.99

CALL DURATION (HH:MM:SS)   00:13:34

REPORT TYPE    03
TARIFF NO      7854          TARIFF TYPE        19
PRICE          324
```

Fig. 5

OUTPUTTING OF REPORTS GENERATED BY A TELEPHONE EXCHANGE

FIELD OF THE INVENTION

The invention relates to the processing of data before they are transferred via the transfer medium to the receiving equipment and then displayed on the display device of the receiving equipment.

BACKGROUND OF THE INVENTION

The number of exchanges is increasing in the operator network, and the exchanges are growing larger. They continually produce a significant amount of various data that have to be processed flexibly and reliably. The operator can use MML (Man Machine Language) commands to modify the desired records, such as the CDR (Call Detail Record) accounting records, for a single subscriber from the block that was stored on the operation and maintenance centre hard disk, and to print them on the screen or paper.

An accounting record is created for every call in the network centre LE (Local Exchange, the subscriber's local exchange) that performs the call-specific accounting. The structure of the accounting record is determined using an operation control command before the call-specific accounting is applied. The created accounting records are sent to the Billing Centre for further processing. The number and size of records have been growing, and the processing and administration require a reliable mechanism to successfully process the different kinds of accounting records. Records are sent to the billing system in large data blocks that may consist of millions of records. The data contained in the records may be in different formats since the raw data stream that was used to format the records during the message creation may contain data in ASCII (American Standard Code for Information Interchange), binary and hexadecimal formats.

The problem with this traditional arrangement is that it is difficult and expensive to change the format. When fields are added to or deleted from a record, there is a risk that the receiving end may not be able to interpret the modified record data stream correctly after the changes. Furthermore, the data stream of a message that is in a different format and contains a number of empty fields increases the amount of data that are transferred from the exchange. It is, therefore, normal to try to avoid making any changes, and all data are sent for further processing irrespective of whether it is necessary or not. Thus, the data stream can be larger than necessary.

The problems described above were solved in the previous patent application FI-971621 by the applicant. According to the patent application, special mother and user forms were employed to enable reliable instant dynamic format changes. The mother form contains the complete structure of the message. For every message, there is a mother form, with all field labels and parameters of the message, that is received as a raw data stream. The operator can view the mother form as plain (ASCII format) text with a graphical interface. The user selects the desired fields from the mother form with a mouse and drops the selected fields into the user form; in other words, the user formats the form to contain only the data that the user wants separate from the data stream. The formatting process separates the records, according to the fields specified in the form, from the raw data stream for sending to the Billing Centre. The Billing Centre uses the user form to interpret the received data stream. There is a large amount of forms available, one for each message type. The use of a form is based on the fact that the position of each field within the message is unambiguously determined by field positions and lengths. Thus, the user form contains references to the field positions and lengths that are to be sent to the Billing Centre. Field labels are not transferred from the exchange to the Billing Centre; they are only in the user form. Only the field content is transferred.

In addition to billing messages, a telephone exchange will produce a great number of messages for special purposes. These messages contain only binary data. Before such messages are sent to a remote destination such as a Network Management System (NMS), they will normally have to be converted into a human-readable format. Therefore, the exchange will normally convert them into ASCII files. The file can then be displayed on the screen in the desired format. The file will now contain headers, space characters and empty lines. In this document, the abbreviation NMS will be used for Network Management System and MML for the MML program.

The simple chart in FIG. 1 shows the prior art system. The telephone exchange contains the MML programs, 111, that are used to control the data collection processes, 112, in the exchange. The operator can print the desired records—such as accounting records—onto the screen, and these will be displayed as plain text on the screen. Having received an MML command, the MML program will request the data acquisition process for the data that correspond with the command, e.g. data on subscriber A. The data acquisition process looks for the data on subscriber A in the database, 113, and sends them to the MML that, in turn, forwards them to the NMS.

ASCII format increases the data streams and wastes the transfer bandwidth since it contains a number of empty or untagged fields. Outputting will contain the actual positioning data or form, which means that similar outputs will transfer the same headers as well as a great number of unnecessary space characters multiple times. When thousands of outputs are being sent, vast amounts of repeated data will be transferred multiple times resulting in an unnecessary load in the transfer medium. Data transfer in ASCII format is also cumbersome and unreliable, and the recipient has no way of determining the type (byte, word, doubleword) of received data. Nor has the recipient any information on the maximum values of the received data elements.

The use of forms, as described earlier, significantly facilitates making changes to the format but still does not solve the problem of transferring unnecessary data between the telephone exchange and the NMS. Most of such data are transferred as ASCII. The data stream contains a significant amount of unnecessary data since both the field headers and the values are transferred.

If it is necessary for the network management to analyse the received text, data control will have to perform searches for a word and a value preceded by a word, which will cause problems if there are multiple instances of the word. In the currently used output format, problems also arise if a word contains a typing error, e.g. if the network management program uses a word with a spelling error as a search key, and the error is corrected at a later processing stage, the word can no longer be found after the correction.

The purpose of the invention is to offer a method that will remedy the inconveniences described above. The objective is a method in which the data stream is minimised by sending only the data that are crucial for outputting without any unnecessary characters (such as space characters) or, in messages that are related to the same topic, repeated data, such as field labels or padding.

The set objectives can be achieved by the method and system that are described in the dependent claims.

SUMMARY OF THE INVENTION

This invention is related to the processing of data that are produced by a telephone exchange, transferring the processed data through a transfer medium to the receiving equipment, and outputting the processed data in the outputting device of the receiving equipment.

The purpose is to produce a solution in which the amount of data transferred through the transfer medium between the telephone exchange and the receiving equipment is decreased by processing, and the data can be interpreted more accurately and reliably than with the current implementations.

This can be accomplished by using fixed forms that are permanently stored in the databases of the telephone exchange and the receiving equipment while making the forms easy to change/update. The exchange will have equipment to separate and forward the desired binary data. The binary stream transferred from the telephone exchange to the receiving equipment through the transfer media will, therefore, only contain the content of the fields requested by the receiving equipment. It will not contain any unnecessary data, such as fields, headers, space characters or the like, that would increase the data stream size. The form will be used to determine the data and the view that is displayed in the display device. By using the form, the receiving equipment can separate the received binary data into sections that were specified in the form and attach every section to the field that is indicated by the respective identifier information.

The method according to the invention either HTML (HyperText Markup Language) forms or XML (Extensible Markup Language) forms are used. HTML form is used in the telephone exchange to form a data stream and the values associated with the data will be transferred from the telephone exchange to at least one receiving equipment in binary format, which received data stream is used in the receiving equipment to form outputs and reports. HTML forms will be used in both directions to process the data, to send the data and to interpret the received data. Forms can be sent from the exchange to the receiving equipment and from the receiving equipment to the exchange. In the receiving equipment the HTML form is used to form a data stream that controls the operation of the exchange.

In one embodiment of the invention, the telephone exchange uses ASCII forms as well as HTML forms to process the data before transferring the data via the transfer medium to the receiving equipment.

An advantageous extra feature of the invention is the setting up of a special monitoring point in, e.g. data control to monitor the binary stream, and to process the received data further only if a certain predetermined condition is met. With the monitoring point, it is possible to, for example, monitor the exchange load or excessively long phone calls, which in turn makes it easier to immediately take the corrective measures as necessary.

BRIEF DESCRIPTION OF THE FIGURES

In the following, the invention is explained in more detail with reference to the following chart drawings, where FIG. 3 illustrates one outputting format of a message when the message structure has been decoded by a structure decoding tool and the layout has been formatted to the desired format, FIG. 4 is the outputting format that has been created by giving the labels in the message in FIG. 3 more descriptive names and giving the format a unique name, FIG. 5 illustrates the final outputting format of an output message in accordance with FIG. 4 to make the message viewable, for example, on the screen.

A DETAILED DESCRIPTION OF THE INVENTION

Figure 1:
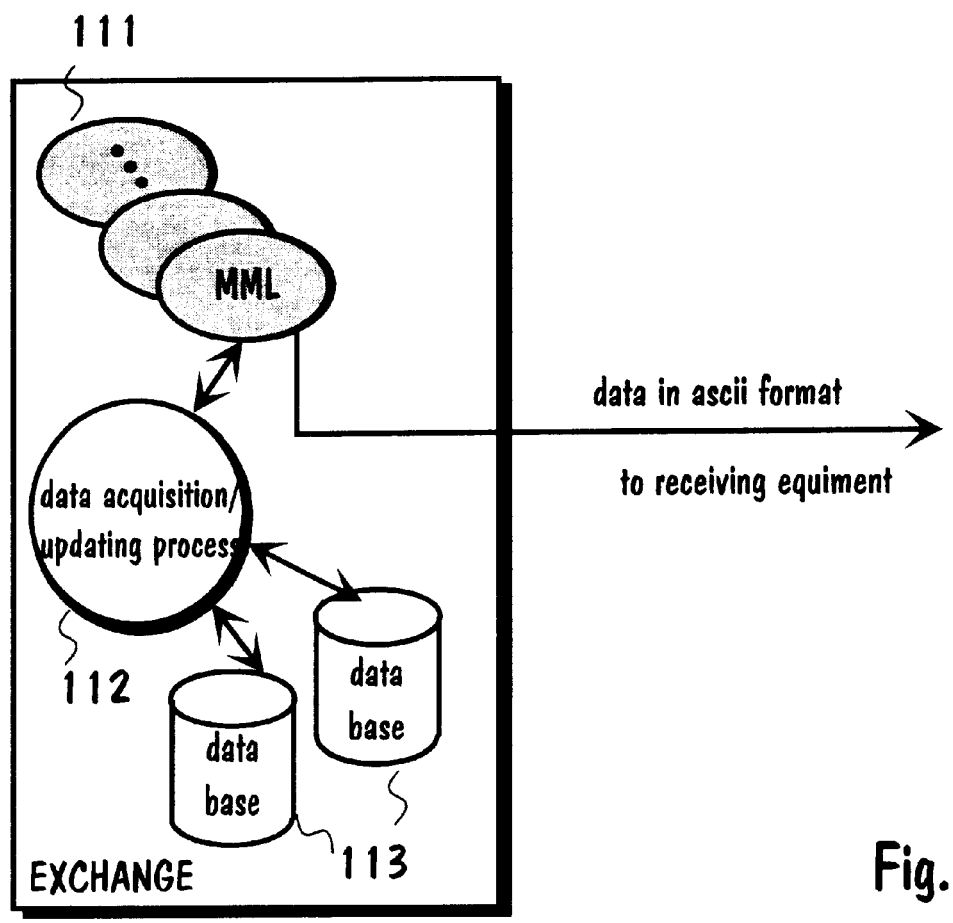
FIG. 1 illustrates the current MML outputting mechanism.
Figure 2:
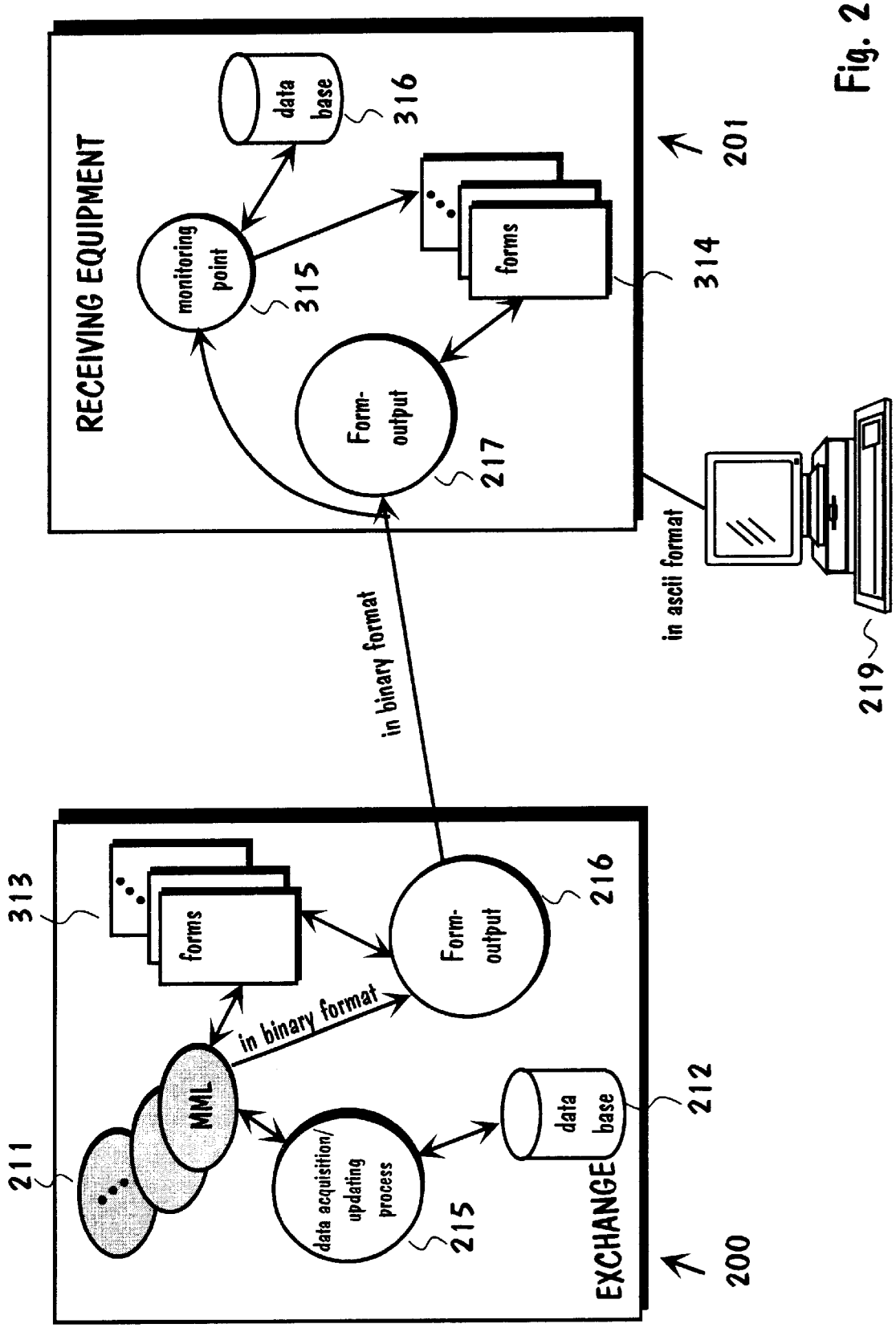
FIG. 2 illustrates the MML outputting mechanism that is implemented in binary format between the telephone exchange and the receiving equipment in accordance with an embodiment of the invention.

Here the basic idea of the invention will be examined using, as an example, FIG. 2. The figure illustrates, with simple drawings, the telephone exchange, 200, and the receiving equipment, 201, that can be, for example, a Network Management System, NMS. As described earlier in the description of the prior art, ASCII format is normally used for data transfer between a telephone exchange and an NMS in modern systems. A message in ASCII format contains unnecessary characters such as space characters and, therefore, wastes the transfer bandwidth. This may cause interpretation errors and overflows at the receiving end. The solution according to the invention uses binary format instead of ASCII format to transfer the message and minimises the binary data stream by only sending the desired crucial data, i.e. the content of the desired fields. Forms will be used to achieve this.

In the telephone exchange, 200, there are several MML programs, 211. There can be hundreds of different MML programs. The fixed forms of each MML program, 313, are in a single file that may contain, for example, tens of different format types. The operator enters MML commands from a terminal to produce the desired output on the screen or paper. Commands can be entered at the telephone exchange end or remotely at the subscriber equipment end, 219. An MML command with the number of subscriber A as the parameter can be used, for example, to request information related to the duration or price of subscriber A's call. The MML program will function according to this command and send a query to the data acquisition process, 215. The data acquisition process, in turn, acquires the data from the database, 212, and then forwards the message to the MML. If the data necessary for outputting can be acquired with one message, the required message structure can be used for processing as such. If the data are acquired with multiple messages, the MML will form an internal outputting structure to collect, from the messages, the data that are required for outputting. The exchange will also contain the Form-output program, 216, that will function in accordance with the instructions by MML: it will retrieve forms, 313, from the form file, collect the binary data that are to be transferred, and place them on the forms. Form-output will perform the processing of the data before the data are transferred to the receiving equipment via the transfer medium.

The processed data are transferred in binary format to the receiving equipment, 201, that is an NMS in this example. The binary stream contains no forms or field labels. Instead, it only contains the field content and the instructions for interpreting the message. This makes it possible to minimise the data stream between the telephone exchange and the NMS, which can, in practical terms, mean a significant reduction for a data stream consisting of hundreds of thousands of records or even millions of records.

To interpret the received binary data, the Form-output program, 217, in the NMS will retrieve the related form from the form file, 314, and then collect and place the binary data on the form. After these operations, the desired data will be transferred to the display terminal, 219, in ASCII format.

The receiving equipment, 201, has a special monitoring point, 315, that will monitor for a specific threshold value that can be, for example, for reports that are output at regular intervals, associated with the exchange load level, or the call duration of a specific user. For example, if the call duration of the user A reaches 3 hours, a report is created and stored in the database, 316. With these reports, it is possible to determine whether a phone call actually lasted several hours or whether it is an error that requires immediate action. The monitoring point can alternatively also be placed directly in the form in the NMS, immediately after the field data, in which case the forms in the exchange and the NMS will be slightly different in this respect.

In the exchange, the data required for outputting are forwarded as messages from the data acquisition process to the MML. The MML will use known processes to acquire the data required for outputting. In the following, there is a description of how these processes are applied to the MML output to make it possible to forward the specified data to the receiving equipment in binary format.

Assuming that the data required for printing can be acquired in a single message, IMMEDIATE_CHARGING_REPORT_S, there is no need to construct a new data type in this case since it is already in the message. The message content is described in the table below.

```
Declare
    immediate_charging_report_s literally
    'structure (
        msg_header        msg_header_t,
        sub_id            byte,
        start_time        calendar_time_t,
        dir_number_a      subsc_number_t,
        dir_number b      subsc_number_t,
        subsc_nbr_id_a    subsc_number_id_t,
        report_type       byte,
        call_duration     duration_time_t,
        tariff_no         charging_zone_t,
        tariff_type       byte,
        price             dword )';
```

The message is input to the structure-decoding tool, that will decode it into data elements. The decoding of the structure and the structure decoding tool were described in the applicant's earlier patent application that was mentioned previously. The structure will be decoded as the following: the data: field label, @ character (analogous to the % character in C), length, type and position information. The length will indicate in bytes the size of the data element contained in the element, the type will indicate whether it is a byte (C), a word (W), a doubleword (DW), or ASCII (ASC), and the position will indicated the starting position of the data element in bytes from the structure starting point. An example:

| Field label  | @ length | type | (position) |
|--------------|----------|------|------------|
| DIR_NUMBER_A | @16      | C    | (25)       |

The output format can be modified to the desired printable format in an editor and unnecessary fields can be removed. There is no need to edit the format if this is a report or if the message will only be output in binary format, in which case the form will only be used to interpret the data.

FIG. 3 contains an example of the output format of the message that was presented in the table above. A form is used in this example. The Form-output procedure according to the invention follows the instructions of the MML. The procedure retrieves, from the form file, the form that corresponds with FIG. 3, collects the binary data that are to be processed, and places them on the form. In this example, subscriber data have been added to the beginning of the form. In this case, the subscriber data include the number of subscriber A (DIR_NUMBER_A) and the number of subscriber B (DIR_NUMBER_B), subscriber A identifier (SUBSC_NBR_ID_A), time fields (START_TIME.HOURS, . . . ,START_TIME.YEAR), output type (REPORT_TYPE), call duration in hours, minutes, and seconds (CALL_DURATION.HOUR, . . . ,CALL_DURATION.SEC), tariff number (TARIFF_NO), tariff type (TARIFF_TYPE), and, finally, call price (PRICE), that can be used to form a price report to determine the cost of a single phone call.

The form is easy to modify. Fields can be repositioned, their names can be edited as desired, and explanatory subheaders can be added. The format name can also be made unique to avoid overwriting. The name can easily be changed by, for example, adding the first three letters of the name of the related program into the format name, CHG in this example.

FIG. 4 illustrates the outputted layout of the edited form from the example above, after the specified operations. The logical file, VDU (Visual Display Unit), can be used for outputting from the program, in which the MML does not have to know whether the output is sent to a display terminal or to the NMS. This is performed using a procedure that could look like the following:

call form_output (@CHG_IMMEDIATE_CHARGING_FORMAT, @IMMEDIATE_CHARGING_REPORT_S);

The procedure can use the positions to pick the data from the message or structure and replace the @ characters with the data, provided that the format and data starting addresses are forwarded in the call. After the operations described above, the screen output would look like FIG. 5.

If the output is to be sent directly in binary format to, for example, the NMS, the Form-output procedure in the exchange will also send the data specified in the IMMEDIATE_CHARGING_REPORT_S form in FIG. 3 to the NMS. A similar Form-output procedure will be used to interpret the binary data in the NMS. The procedure will select the correct data processing form stored in the NMS form file for the received data. The format name that has been appended to the beginning of the binary data, e.g. CHG_IMMEDIATE_CHARGING_FORMAT, or another unique identifier as well as the data length information, data processing file name and version will be used to retrieve the correct form from the form file. Form-output will combine the data and the format, after which the received binary message can be printed on the screen as plain text. The form format can be easily converted into C language format to make it generic rather than exchange-specific.

With this solution, it is possible to minimise the data stream between the telephone exchange and the NMS. It is, likewise, possible to reduce error situations since the receiving end does not have to search the data stream for words as it knows, based on the forms, where exactly the required value can be found.

The description above makes no mention of the form types. In the following examples, there can be three form types: the first example uses ASCII forms, the second example uses HTML forms in both directions, and the third example uses HTML forms and ASCII forms concurrently.

Figure 6:
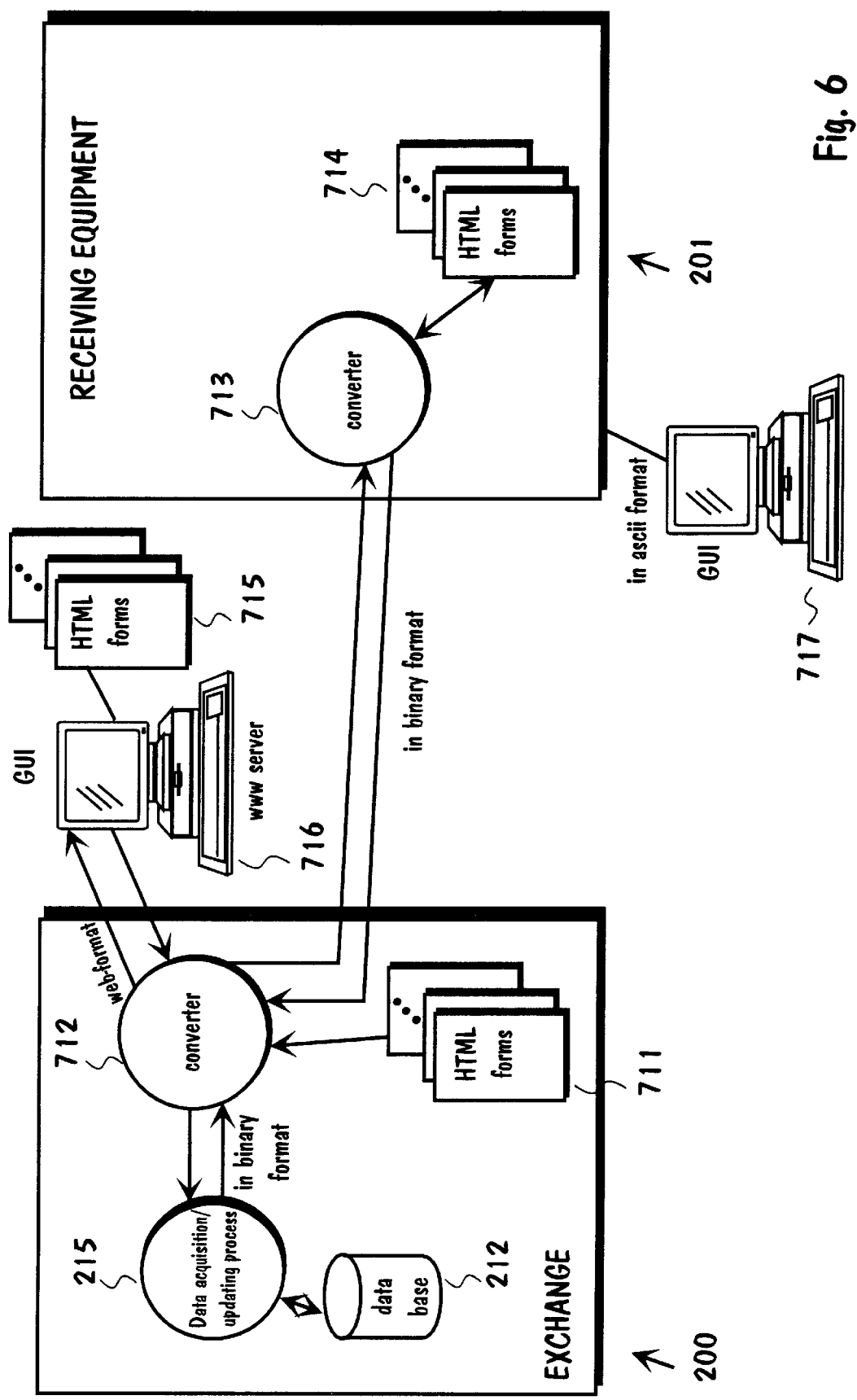
FIG. 6 illustrates the MML outputting mechanism that is implemented in binary format between the telephone exchange and the receiving equipment in accordance with one embodiment of the invention.

FIG. 6 illustrates the operating principle of the second embodiment of the invention. This solution uses HTML forms in both directions, i.e. the exchange uses forms for the data stream to the GUI (Graphical User Interface) in order to control the output and reports, and the GUI uses forms that control the operations of the exchange (cfr. MML commands). The MML commands are omitted completely, and, thus, HTML forms, 711 and 714, are used instead of the forms of the previous example both at the telephone exchange end and at the NMS end.

In this implementation, the Form-output procedure of FIG. 2 is replaced by converters, 712 and 713, that will be used to convert the format of exchange forms into the format that is used by the GUI. The converter may be placed in the exchange or in the WWW server, in which case the data will be transferred in binary format to the server. In this example, the converter is in the exchange. Instead of MML commands, equivalent HTML forms will be used to control the exchange. The converter will convert the form data to exchange messages. For example, the operator wishes to create a new subscriber, instead of MML commands, the required information on subscriber A will be entered into the created subscriber form that was automatically generated from the respective exchange message. The data will then be sent to the converter that creates a conventional exchange message based on the data and sends the message to the process that offers the service. The process, in turn, will implement the requested changes such as adding a new subscriber to the database. The conversion will be implemented at the telephone exchange end and the receiving equipment end. The converter operates similarly to the Form-output procedure of the embodiment that was described earlier. The data acquisition/updating process will forward the data necessary for the outputting as messages to the converter, which will read the form identifier of the received binary format message. It will use the identifier to find the HTML form associated with the message in the form file, collect the data required by the HTML form, enter the field values into the form, and forward the filled HTML form to the WWW server. The WWW server can process the data further, store them, or output them.

Other XML (Extensible Markup Language) forms that are used according to a similar principle can also be used instead of HTML forms.

An XML form can also be used like a HTML form to interpret the binary stream. Binary data can also be placed on a form in the receiving equipment, in which case the data can be sent, processed further, or organised further directly in the standardised XML format.

Alternatively, if the receiving equipment is an NMS, the converter at the telephone exchange end will send the data in binary format to the NMS, that can store the binary stream for further processing, or the converter at the NMS end can select the form associated with the data from the form storage to interpret the received data.

In this implementation, messages can be sent in both directions, i.e. from an NMS to the telephone exchange or from a WWW server to the telephone exchange, and the messages can be decoded into telephone exchange messages. A common HTML form can be used for the possible error output and responses to interpret and control error situations. In this case, forms will be used to forward the error code and error output. In this alternative, it is possible to use the WWW to control and interpret the exchange operation with a Graphical User Interface, GUI; 716 and 717, without any MML. The Graphical User Interface, GUI, can, therefore, be implemented both at the telephone exchange end and the NMS end, and the control will operate in a similar manner at both ends.

Figure 7:
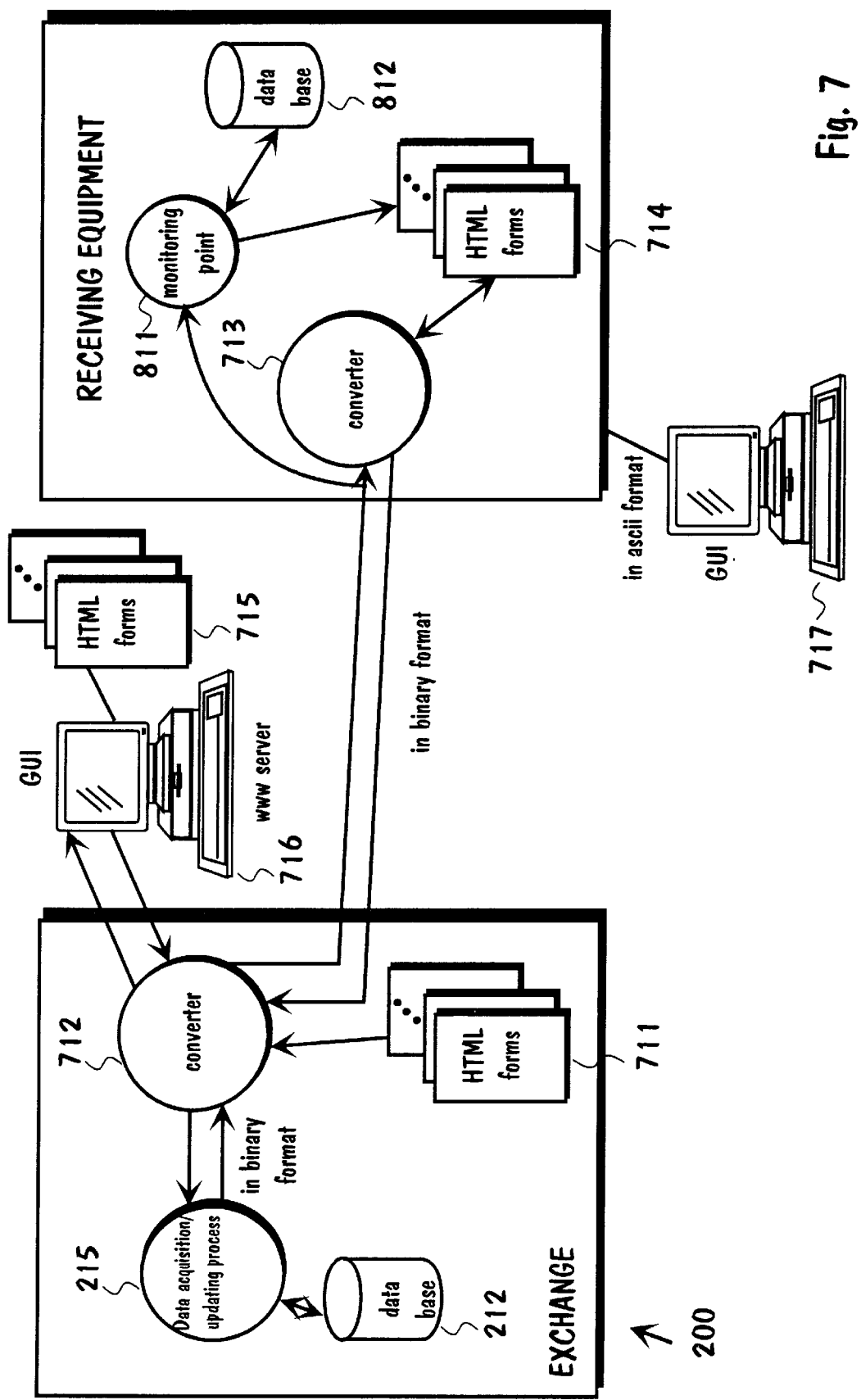
FIG. 7 illustrates the MML outputting mechanism that is implemented in binary format between the telephone exchange and the receiving equipment in accordance with another embodiment of the invention.

FIG. 7 illustrates an implementation where the receiving equipment has a monitoring point, 811, that operates on the same principle as the implementation of FIG. 2. The monitoring point monitors the criteria for a predetermined condition, and if the condition is met, the monitoring point will immediately send a report or store the information for further processing.

Figure 8:
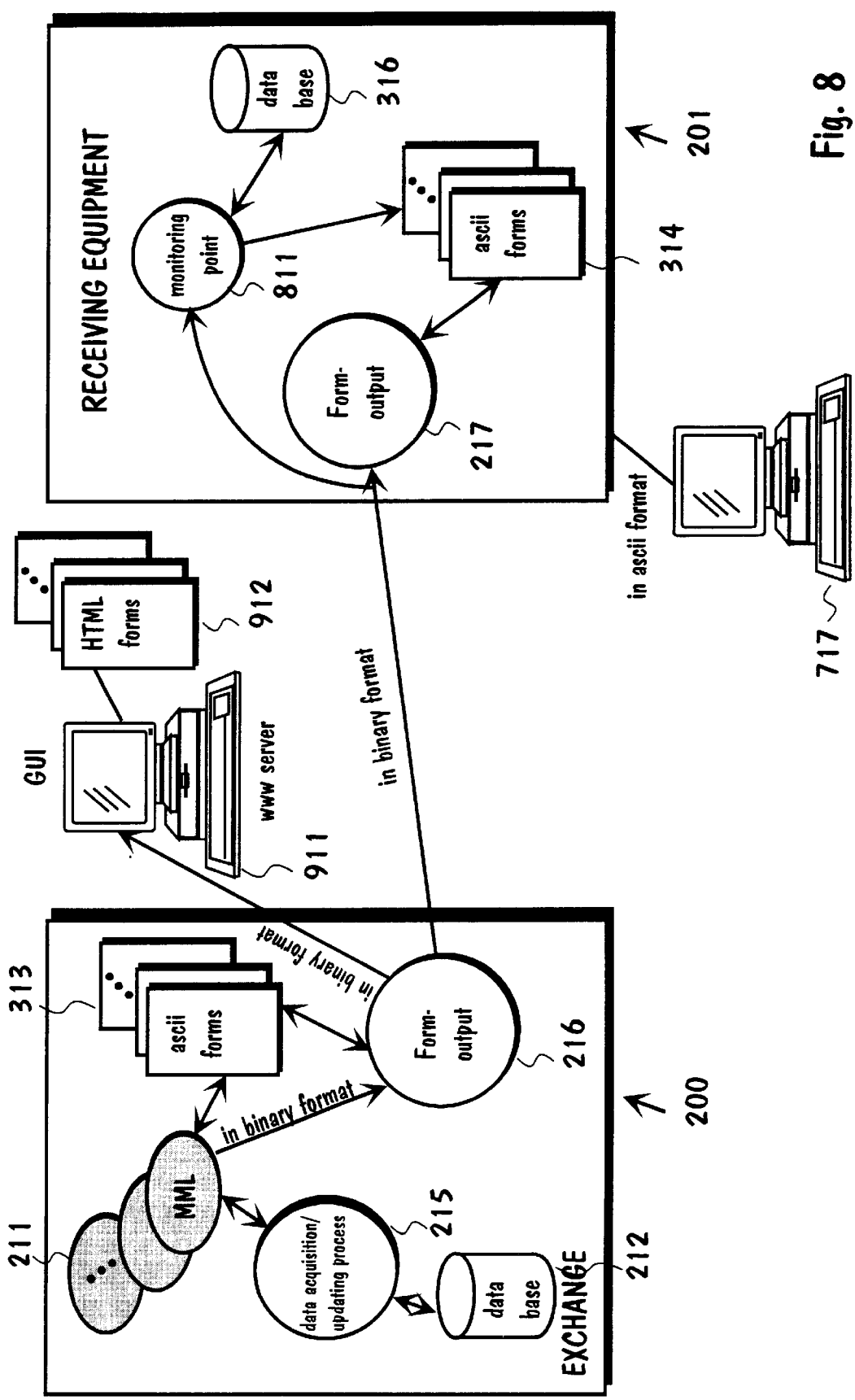
FIG. 8 illustrates the MML outputting mechanism that is implemented in binary format between the telephone exchange and the receiving equipment in accordance with an embodiment of the invention.

FIG. 8 illustrates an application of the invention. A telephone exchange uses HTML forms, 912, in addition to ASCII forms, 313 and 314, to process the data. Form generation will be performed as described in the earlier examples. In this implementation, the fixed ASCII forms have been placed in the exchange and the receiving equipment that can be, for example, an NMS while the HTML forms have been placed only on the WWW server.

Output messages will be sent in binary format only to the WWW server. The WWW server has HTML forms whose formats correspond with the ASCII forms, and the WWW server can place the received binary data in an HTML form that corresponds with an ASCII form, thus producing readable screen output.

In addition to sending binary streams from the telephone exchange to the WWW server, it is possible to send binary streams between the exchange and an NMS using ASCII forms. The most significant advantages of the solutions described above include:

the data stream between the telephone exchange and the Graphical User Interface, GUI, as well as between the telephone exchange and the NMS is reduced to a fraction of its current volume, the NMS can use a form to determine the exact position and length of a field transferred in the binary data, and the desired values can be selected directly from the binary stream, while the prior art method makes it necessary to look for the values in an error-prone ASCII output, the monitoring of binary stream can be easily implemented by using form field-specific monitoring points, if the response or data are changed, an updated ASCII, HTML file or XML file will always be sent to the telephone centre and the NMS, and the NMS will, thus, always have an up-to-date interpreter and description, in addition to the exact position and length information, the outputting end (NMS, GUI) will recognise the variable types (byte, word, dword, ASCII . . . ) containing the data and, therefore, also the field maximum values, the layout of the ASCII, HTML or XML output can be modified without causing any interference in the NMS provided that the binary streams remain unchanged, the production of performance output at the telephone exchange end will become easier to code, and layout changes can be achieved simply by editing the format without having to modify the code.

Forms can be created for different outputs in the solution according to the invention. The forms are not customer-specific and there is, therefore, no need to create a new form for e.g. a new customer. However, customer-specific forms may also be created if necessary. For example, if a customer wishes to have a different output format, customer-specific custom forms can be created. Optional form information can also be implemented with forms: if a customer does not wish to see the value of a parameter or has not purchased the associated feature, the parameter can be omitted from the form. When a new software package is dispatched to the exchange, the old forms will be updated in the exchange and the receiving equipment as necessary. The forms can be, for example, collected into a program-specific file (or files) that contains all data processing formats used by the program. Even though the forms are already present in the receiving equipment, the forms can still be transferred between the exchange and the receiving equipment. In special cases, forms can be sent with the binary stream. For example, the receiving equipment might not find the required form in the form storage. In this case, the receiving equipment would request the exchange for the required form and, upon receiving it, add it to the form storage. A form can also be sent in the binary stream in error situations.

For programmers, it becomes significantly easier to create performance outputs in the exchange. To change the layout of the output, one would modify the format (form) but there is no need to change the program code. For example, to change the language, one would merely have to send a new form with the new language strings to the exchange.

An output according to the invention means that the data can be output in the desired format on different media such as a computer screen or paper.

Although the invention was described using examples associated with the enclosed drawings, the invention can of course be modified according to the attributes described above and in the following patent claims. The solution can be applied to different operation platforms and applications such as banking systems, meteorological and road stations and other systems that process large amounts of data.

The mechanism can also be adapted outside a telephone exchange, in which case Unix or Windows workstations, among others, could be used. The forms can be placed either in a single file or they can be distributed into several files, one form per file.

There are also other ways to implement the WWW server than the one described in the examples. For example, the WWW server, 716, in FIG. 6 can also be implemented as software in the exchange, 200, in which case, the server is not an independent physical device, and the terminal used by the user via, e.g. a TCP/IP connection, can be physically distant from the exchange. An implementation might have the WWW server, 716, as in the figure while the Graphical User Interface, GUI, is implemented in a separate terminal device.

What is claimed is:

1. A method to output data generated by a telephone exchange, the method comprising:

storing a form determining fields that are to be printed and identifier information associated with the fields in the telephone exchange and a receiving equipment, forming, by means of the form, a data stream consisting of binary data in the telephone exchange, sending the data stream to the receiving equipment, separating, by using the form stored in the receiving equipment, the incoming binary data into parts specified by the form such that each part is attached to a field indicated by corresponding identifier information, forming, in the receiving equipment by means of the form, a control data stream for use in the control of the operations of the telephone exchange, and outputting the data and identifier information on the fields.

2. A method in accordance with patent claim 1, wherein a form in HTML format is used.

3. A method in accordance with patent claim 1, wherein a form in XML format is used.

4. A method in accordance with patent claim 1, wherein a form in ASCII format is used with a form in HTML format or a form in XML format.

5. A method in accordance with patent claim 1, wherein the forms have been centralised into a single file.

6. A method in accordance with patent claim 1, wherein the forms have been distributed into separate files with at least one form per file.

7. A method in accordance with patent claim 1, wherein the incoming binary data is monitored in the receiving equipment, and when a certain predetermined condition is met, the actions associated with the condition are performed.

8. A telecommunications system comprising a telephone exchange, the data of which will be pre-processed by a data acquisition process before the data is sent to receiving equipment for outputting in a desired format, the system further comprising:

at least one form that determines fields that are to be printed and identifier information associated with the fields, databases in the telephone exchange and the receiving equipment for storing the at least one form, means for generating a binary data stream in the telephone exchange by selecting data from pre-processed data using said at least one form, and for sending the data stream to the receiving equipment, means in the receiving equipment for separating binary data by means of said at least one form into parts specified in the form and to attach each part to a field specified by a corresponding identifier information, means for forming a control data stream in the receiving equipment by means of the form for use in the control of the operations of the exchange, and outputting devices for outputting the fields and identifier information in the desired format.

9. A telecommunications system in accordance with patent claim 8, wherein the receiving equipment is a Network Management System.

10. A telecommunications system in accordance with patent claim 8, wherein the receiving equipment is a WWW server.

11. A telecommunications system in accordance with patent claim 8, wherein the receiving equipment has a special monitoring point for monitoring the incoming binary data and, when a certain predetermined condition is met, performing the actions associated with the condition.

\* \* \* \* \*